Patented June 17, 1952

2,601,173

UNITED STATES PATENT OFFICE 2,601,173

METHOD OF DETERMINATION OF THE COLOR OF EGG YOLK PRODUCTS

Edgar Selz, Chicago, Ill., assignor to The Emulsol Corporation, Chicago, Ill., a corporation of Illinois No Drawing. Application March 3, 1950, Serial No. 147,571

13 Claims. (Cl. 23—230)

My invention relates to a new and improved method for determining the color of egg yolk products.

The determination of the color of egg yolk products, for example, frozen egg yolks, by visual comparison methods is not feasible because of the relatively high degree of inaccuracy which such procedure involves. While a number of other methods has heretofore been suggested, none has proven very satisfactory. The most commonly accepted procedure comprises extracting the egg yolk product with acetone, filtering, and comparing the color of the resulting solution or filtrate with standard potassium dichromate solutions. Such procedure possesses a number of marked disadvantages among which may be mentioned the difficulty of obtaining complete extraction since the acetone precipitates egg protein, the loss of the volatile acetone, and the necessity for filtration. Such procedure is time-consuming and the cost of making such color determinations is substantial where large numbers of them are required.

In accordance with my invention, a materially simplified procedure has been evolved in the form of a direct method of color determination wherein the time required for such determination is substantially reduced and wherein, concomitantly, the cost of making the same is sharply decreased.

In general, in accordance with my present invention, the egg yolk product, which is relatively opaque, is admixed with a water-soluble electrolyte which has the property of dispersing egg proteins and which does not precipitate the egg proteins, or which is used in proportions insufficient to precipitate the egg proteins, and with an amount of glycerin or a polyglycerol, especially glycerin, greater than the amount of the water-soluble electrolyte, so as to produce a transparent or essentially transparent solution. The color of such solution is then compared with a standard by any usual procedures as, for example, by means of a comparator such as the La Motte comparator, or by photo-electric colorimeters.

The invention is applicable to the determination of the color of such egg yolk products as ordinary or fresh liquid egg yolks; salt yolk products containing varying amounts of sodium chloride as, for example, from 1% to 12% of sodium chloride; sugared yolk products containing from less than 1% of added sugars up to 10% or more of such sugars; frozen yolks and frozen salted and/or sugared yolks; whole eggs; and, in general, to any egg product containing at least 35% by weight of yolk with or without various addition agents.

The nature of the invention will best be understood in the light of the following example where a typical procedure is described for the determination of the color of a salted yolk product containing 9 parts by weight of egg yolk containing 45% egg solids and 1 part by weight of added sodium chloride. It will be understood that this example is purely illustrative and is in nowise limitative of the scope of the invention.

Example

To 5.5 grams of the aforesaid salted yolk product, 5 ml. of a 20% sodium chloride aqueous solution were added and the mixture was stirred to obtain good dispersion. Then, 90 ml. of a reagent were added and thoroughly stirred whereby a transparent solution resulted. (The reagent was previously prepared by admixing 850 ml. of commercial 95% glycerin with 50 ml. of a 20% sodium chloride aqueous solution, the sodium chloride solution being added to reduce the viscosity of the glycerin.) The transparent egg yolk-containing solution was then transferred to matched glass tubes of 15 mm. outside diameter and compared visually with color standards in a La Motte color comparator. Said comparator should preferably have a ground glass background, and the colors are matched by viewing them against diffused daylight or so-called "daylight" fluorescent light.

Various color standards may be utilized employing various types of indicators. I have found that phenol red standards, buffered at a pH of about 6.2 have a shade of yellow much closer to the egg color than potassium dichromate standards and, for this reason, a visual comparison is possible. The maximum absorption of the phenol red at a pH of 6.2 is between wavelength of 440 to 450, which is very close to the maximum absorption of the yolk color which is at about 450, whereas the maximum absorption of potassium dichromate is below 380.

One illustrative manner of preparing the standards comprises dissolving 100 mg. of Merck's reagent Phenol Red in 14.2 ml. N/50 NaOH solution and then diluting to 250 cc. with distilled water. Then, 25 ml. of this solution is diluted to 250 ml. with McIlvane phosphate citrate buffer solution of pH 6.2 to 6.25. This is the stock solution for the standards. Different dilutions of this stock solution are prepared and calibrated against the color of a large number of egg samples whose color has been accurately determined by the National Egg Products Association (N. E. P. A.) method, namely, the color of the filtered acetone extract in terms of potassium dichromate concentrations. The optical density of each of the standards is advantageously determined in order to enable them to be exactly reproduced and so as to check, periodically, their stability on standing. It will be understood, of course, that the phenol red dilutions may be calibrated against any other system of yolk color determination, such as the Gaston Dalby method which uses acidified potassium dichromate standards. It will also be appreciated that, once a calibration curve of the optical density of the phenol red solutions or other indicators is obtained on a wavelength of say 450, it is possible to check the visual color determination of the yolk product after treatment pursuant to the present invention on the electrophotometer.

I prefer particularly to utilize sodium chloride, as has been indicated above. However, as previously stated, other water-soluble electrolytes may be employed provided that they do not precipitate the egg proteins or are used in proportions insufficient to cause such precipitation. Typical examples of water-soluble electroyltes which may be utilized are sodium acetate, ammonium acetate, sodium nitrate, potassium nitrate, ammonium nitrate, potassium chloride, ammonium chloride, ammonium bicarbonate, and sodium sulfate, potassium iodide. Although mixtures of certain of said water-soluble electrolytes may be utilized, I find it more advantageous to use only a single one.

The amounts of water-soluble electrolyte and glycerin which are added to the egg yolk products are, of course, variable although, in any case, they should be standarized in relation to the egg yolk content of the egg yolk product to be tested in order to simplify the testing procedure, particularly where testing is carried out on a regular, as distinguished from sporadic, basis and where a relatively large number of determinations is required to be made. In general, a convenient sample for testing is 5 grams of yolk or, for egg products other than straight yolk, an amount equivalent to 5 grams of yolk. To this sample, if it does not already contain an added electrolyte such as sodium chloride, I add an amount of sodium chloride or the like usually equal to about 40% to 60% by weight of the yolk solids present in the sample. This sodium chloride or other electrolyte is preferably added in the form of an aqueous solution of 15% to 25% concentration. The amount of glycerin then added is very substantially in excess of the amount of sodium chloride or the like, usually from 40 to 60 times as much by weight. As indicated in the illustrative example above, I prefer to reduce the viscosity of the glycerin before adding it to the egg yolk product-water soluble electrolyte mixture. This may be done in a variety of ways but I find it advantageous to accomplish this end by pre-mixing the glycerin with a minor proportion of an aqueous solution of sodium chloride. The glycerin may be used without reducing its viscosity but the resulting egg yolk product solution is slightly more difficult to handle.

In place of glycerin, or in admixture with glycerin, I may use polyglycerol, such as diglycerol, but the use of polyglycerols is distinctly not preferred because the solutions which result from their use are too viscous for convenient handling. Wherever I refer in the claims to "a glycerol," it will be understood to encompass glycerin, polyglycerols, and mixtures thereof.

In the light of the foregoing detailed description, it will be seen that I have evolved a simple and direct method which eliminates extraction and filtration steps, which is rapidly carried out at low cost, and with a high degree of accuracy. Since the teachings contained herein may take different forms, within the scope of the guiding principles disclosed, the invention is not to be limited to details except as they may fall within the scope of the appended claims.

What I claim as new and desire to protect by Letters Patent of the United States is:

1. A method of determining the color of egg yolk products containing at least 35% of egg yolks which comprises mixing a predetermined quantity of said egg yolk products with a water-soluble electrolyte having the property of dispersing egg proteins and with a larger proportion of a glycerol whereby to produce a substantially transparent product, and then comparing the color thereof against a standard.

2. The method of claim 1, wherein the color standard is a phenol red solution buffered to a pH of about 6.2.

3. A method of determining the color of egg yolks which comprises mixing a predetermined quantity of said egg yolks with an aqueous solution of a water-soluble electrolyte having the property of dispersing egg proteins, and then mixing therewith a materially greater amount of a glycerol whereby to produce a substantially transparent product, and then comparing the color thereof against a standard.

4. A method of determining the color of liquid egg yolks which comprises mixing a predetermined quantity of such liquid egg yolks with a water-soluble crystalline salt having the property of dispersing egg proteins and a larger amount of glycerin whereby to produce a substantially transparent product, and then comparing the color thereof against a standard.

5. The method of claim 4, wherein the color standard is a phenol red solution buffered to a pH of about 6.2.

6. A method of determining the color of egg products containing at least 35% of egg yolks which comprises mixing a predetermined quantity of such egg products with an amount of a water-soluble electrolyte having the property of dispersing egg proteins and a larger amount of glycerin whereby to produce a substantially transparent product, and then comparing the color thereof against a standard.

7. A method of determining the color of egg products containing at least 35% of egg yolks which comprises mixing a predetermined quantity of such egg products with an amount of sodium chloride and a larger amount of glycerin whereby to produce a substantially transparent product, and then comparing the color thereof against a standard.

8. A method of determining the color of liquid egg yolks which comprises mixing a predetermined quantity of such liquid egg yolks with an amount of sodium chloride and a very much larger amount of glycerin whereby to produce a substantially transparent product, and then comparing the color thereof against a standard.

9. A method of determining the color of egg yolks which comprises mixing a predetermined quantity of said egg yolks with a substantially neutral, crystalline water-soluble electrolyte having the property of dispersing egg proteins and with a larger proportion of glycerin whereby to produce a substantially transparent product, and then comparing the color thereof against a standard.

10. A method of determining the color of egg yolk containing from about 1% to about 12% of sodium chloride, which comprises mixing a predetermined quantity of said salted egg yolk products with an additional proportion of sodium chloride, then thoroughly mixing the same with an aqueous solution containing a minor proportion of sodium chloride and a major proportion of glycerin whereby to produce a substantially transparent product, and then comparing the color thereof against a standard.

11. A method of determining the color of egg yolks which comprises mixing therewith an aqueous solution of sodium chloride and stirring to obtain a good dispersion, adding an aqueous solution containing minor amounts of water and sodium chloride and several fold as much glycerin, stirring thoroughly, and then comparing the color of the resulting essentially transparent solution against a standard.

12. The method of claim 11, wherein the color standard is a phenol red solution buffered to a pH of about 6.2.

13. A method of determining the color of egg yolks which comprises mixing a predetermined weight of the egg yolks with an amount of an aqueous solution of sodium chloride so that said mixture contains an amount of sodium chloride equal to from about 40% to about 60% by weight of the egg yolk solids therein, stirring to obtain a good dispersion, adding glycerin in amount at least several times the amount of the sodium chloride, stirring thoroughly, and then comparing the color of the resulting essentially transparent product against a standard.

EDGAR SELZ.

REFERENCES CITED

The following references are of record in the file of this patent:

UNITED STATES PATENTS

| Number | Name | Date |
|---|---|---|
| 2,065,114 | Cahn et al. | Dec. 22, 1936 |